United States Patent
Gebhard et al.

[11] Patent Number: 6,033,557
[45] Date of Patent: Mar. 7, 2000

[54] FILTER USE LIMITATION DEVICE FOR LIQUID CONTAINERS

[76] Inventors: Albert W. Gebhard, 2101 E. Alameda, Denver, Colo. 80209; Robert M. Parker, 961 Sable Blvd., Aurora, Colo. 80011

[21] Appl. No.: 09/089,178

[22] Filed: Jun. 2, 1998

[51] Int. Cl.⁷ .......................... B01D 35/143; B01D 17/12; B01D 35/027
[52] U.S. Cl. .............. 210/85; 210/91; 210/100; 210/469; 210/482; 116/264; 116/284; 222/23
[58] Field of Search .................. 210/85, 87, 91, 210/100, 282, 473, 474, 475, 477, 266, 464, 466, 469, 476, 482; 116/264, 284, 285, 286, 294, 298; 222/23, 36, 189.06

[56] References Cited

U.S. PATENT DOCUMENTS

| | | |
|---|---|---|
| 1,425,456 | 8/1922 | Dial . |
| 2,190,606 | 2/1940 | Fedder . |
| 4,515,019 | 5/1985 | Woodfill ................................. 73/756 |
| 4,729,472 | 3/1988 | Lubin et al. ....................... 206/315.9 |
| 4,764,274 | 8/1988 | Miller ................................... 210/282 |
| 4,895,648 | 1/1990 | Hankammer ......................... 210/477 |
| 5,011,032 | 4/1991 | Rollman ............................... 215/230 |
| 5,065,901 | 11/1991 | Brane et al. ......................... 210/100 |
| 5,082,129 | 1/1992 | Kramer ................................ 215/221 |
| 5,188,251 | 2/1993 | Kusz .................................... 215/220 |
| 5,190,643 | 3/1993 | Duncan et al. ....................... 210/85 |
| 5,299,701 | 4/1994 | Barker et al. ........................ 215/230 |
| 5,328,597 | 7/1994 | Boldt et al. ........................... 210/87 |
| 5,431,205 | 7/1995 | Gebhard .............................. 141/351 |
| 5,486,285 | 1/1996 | Feeney ................................. 210/489 |
| 5,536,394 | 7/1996 | Lund et al. ........................... 210/87 |
| 5,567,308 | 10/1996 | Visser .................................. 210/474 |
| 5,622,618 | 4/1997 | Brane et al. ......................... 210/100 |
| 5,873,995 | 2/1999 | Huang et al. ........................ 210/475 |
| 5,900,138 | 5/1999 | Moretto ................................. 210/85 |

*Primary Examiner*—Joseph W. Drodge
*Attorney, Agent, or Firm*—John E. Reilly

[57] ABSTRACT

A filter use device is adapted for use with various types of containers, such as, liquid containers for water coolers in which the device includes a cap to be threaded onto an open end of the container, a filter cartridge in the cap which retains a conventional filter and a resilient pawl which is engageable with a disk having an indicator aligned with a slot in the cap and engageable with ratchet teeth to incrementally advance the indicator each time that the cap is threaded onto the end of the container; and when the indicator reaches the end of the slot is shifted to prevent any further advancement of the disk or passage of water through the filter or device and thereby signify the end of the life of the filter and the need for replacement of the filter. The number of rachet teeth may be varied in accordance with the number of containers with which the filter is to be used. In an alternate form, a resetting wrench is provided to return the pawl to its starting point for reuse with a replacement filter without discarding the entire cap.

20 Claims, 2 Drawing Sheets

6,033,557

FILTER USE LIMITATION DEVICE FOR LIQUID CONTAINERS

BACKGROUND AND FIELD OF INVENTION

This invention relates to filter devices; and more particularly relates to replaceable filters for liquid containers, particularly water, and to a novel and improved means for monitoring the number of uses of the filter.

There is increasing popularity and demand for filtered drinking water and, both in home and offices, water dispensers are in use which require a replaceable filter to remove contaminants from the water. In the past, typically the approach has been to monitor the number of times that the same container is filled with water and then filtered but are not capable of monitoring the number of times that each filter is placed on a different bottle. Nevertheless, in most widespread use both in the home or office are water services of the type in which the container, once empty, is replaced by another container filled with water or at least requires removal of a cap in order to refill the empty container. Accordingly, there is a need for a filter use limitation device in which the number of times that the filter is used is correlated with the number of times that it is removed and replaced onto one or more containers.

Representative prior art patents are U.S. Pat. No. 5,190,643 to Duncan et al, U.S. Pat No. 5,328,597 to Boldt, Jr. et al, U.S. Pat. No. 5,536,394 to Lund et al and U.S. Pat. No. 5,299,701 to Barker et al.

SUMMARY OF THE INVENTION

It is therefore an object of the present invention to provide for a novel and improved filter use limitation device which is highly accurate and dependable in use.

Another object of the present invention is to provide for a filter cartridge in which the usage of the filter is based upon the number of times that it is threaded or otherwise placed onto one or more liquid containers.

It is a further object of the present invention to provide for a novel and improved liquid container assembly for accurately monitoring and limiting use of a filter to its useful life and wherein the monitoring and indicating means may be incorporated into a cap or cover for the container.

It is a still further object of the present invention to provide for a novel and improved disposable filter use limitation device made up of a minimum number of parts and which is greatly simplified and inexpensive in construction.

It is an additional object of the present invention to provide for a novel and improved filter use limitation device which is conformable for use with different types of containers and which may either be of the disposable type or permit selective resetting each time that the filter element is replaced.

In accordance with the present invention, there has been devised for use in a liquid container assembly in which a container is provided with a normally open threaded end a filter use limitation device which comprises a cap adapted to be threaded onto the end of the container, a filter cartridge positioned at least partially within the cap having a filter in a hollow portion of the cartridge and a resilient pawl at one end of the cartridge, and further a disk is interposed between the cartridge and end wall of the cap having an indicator aligned with a slot in the cap, and a plurality of ratchet teeth are engageable in succession by the pawl to rotate the disk with respect to the cap a distance corresponding to the distance between each pair of adjacent ratchet teeth each time that the cap is threaded onto the end of the container. In this way, the indicator is incrementally advanced relative to the slot a distance proportional to the advancement of the pawl between adjacent ratchet teeth each time that the cap is threaded onto the end of a container.

In the preferred form, the ratchet teeth and pawl are so constructed and arranged as to prevent resetting once the pawl reaches the last ratchet tooth, as a result of which the entire filter cartridge, disk and cap must be replaced. In a modified form of invention, the ratchet teeth and pawl are designed such that a resetting wrench can be employed to return the pawl to its starting point and similarly to return the indicator to its starting point and, in this setting, contemplates replacement of the filter element each time that the device is reset.

Assuming that the filter cap cannot be reset, another feature of the invention is the utilization of an anti-reverse mechanism between the disk and filter cartridge to prevent accidental reverse movement of the disk relative to the cap, for example, when the cap is unthreaded from the end of the container. It will be appreciated that the number of bottles which can be filtered by each filter is regulated by the number of ratchet teeth on the disk. It is therefore desirable that the number of ratchet teeth and their arrangement may be modified in accordance with the size of container or bottle with which it is to be used, since the filter will maintain its effectiveness with a greater number of containers as the size of the containers decreases.

The above and other objects, advantages and features of the present invention will become more readily appreciated and understood from a consideration of the following detailed description of preferred and modified forms of the present invention when taken together with the accompanying drawings in which:

DETAILED DESCRIPTION OF PREFERRED EMBODIMENT

Figure 1:
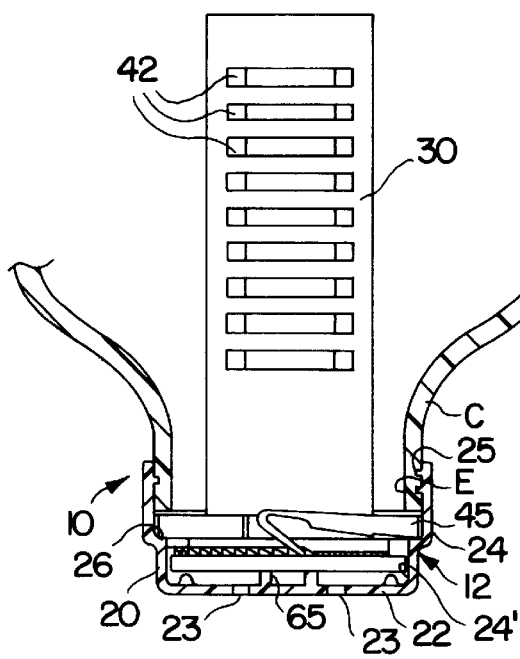
FIG. 1 is a somewhat fragmentary view illustrating a preferred form of filter use limitation device in assembled relation to the threaded end of a liquid container and illustrating a use-monitoring device at its starting point.
Figure 2:
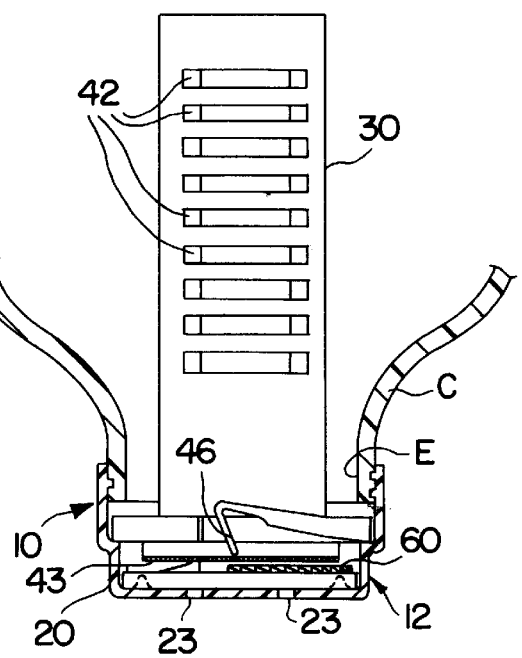
FIG. 2 is a view similar to FIG. 1 but illustrating the use-monitoring device at the end of the intended use of the device.
Figure 3:
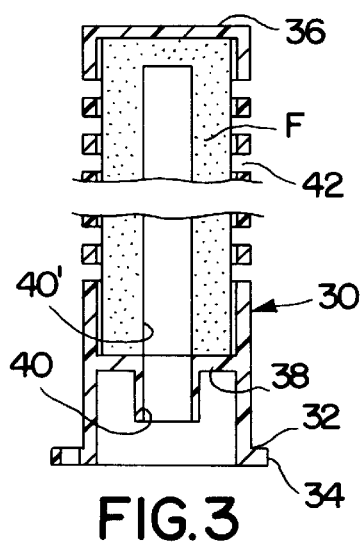
FIG. 3 is a cross-sectional view of a preferred form of filter cartridge employed in the assembly of the present invention.

Referring in more detail to the drawings, there is shown by way of illustration but not limitation in FIGS. 1 and 2 a liquid container assembly 10 which is broadly comprised of a liquid container C having a normally open, threaded end E, and a preferred form of filter use limitation device 12 is threaded onto the end E. The container C as illustrated is a five-gallon jug and is merely representative of various containers for which the device 12 can be used, only the open end E being shown in somewhat fragmentary form and inverted in FIGS. 1 and 2 so as to be in its usual orientation when in use as a part of a water cooler, for instance, of the type shown and described in U.S. Pat. No. 5,431,205 to A. W. Gebhard.

The filter use limitation device 12 is basically made up of a cap 20 having an end wall 22 provided with arcuate slots 23 therein and an outer circumferential side wall 24 having internal threading 25 to mate with complementary threading on the end E. The cap 20 is formed also with a shoulder 26 between the threaded portion 25 and end wall 22 and in facing relation to a rim 14 of the open end E, the shoulder 26 terminating in a side wall 24' of reduced diameter thereby forming a somewhat reduced end including the end wall 22.

As shown in FIGS. 1 to 4, a filter cartridge 30 is of hollow, generally cylindrical configuration having an end 32 surrounded by a flange 34 and an opposite closed end 36. A cylindrical filter F of conventional construction is inserted into the cartridge 30 and retained therein by an annular plate 38 having a central opening or port 40 aligned with an opening 40' in the filter F. A series of slots 42 are spaced along the length of the cartridge 30 to constrain water or other liquid to flow downwardly through the filter F and the port 40. In the preferred form, the cartridge 30 is designed to permanently retain the filter F and to be discarded along with the rest of the device 16 after the filter F has been replaced a selected number of times onto different containers and reached the end of its intended life; however, in a manner to be described in connection with a modified form of invention, the filter F may be replaced so as to permit reuse of the device 12.

Figure 10:
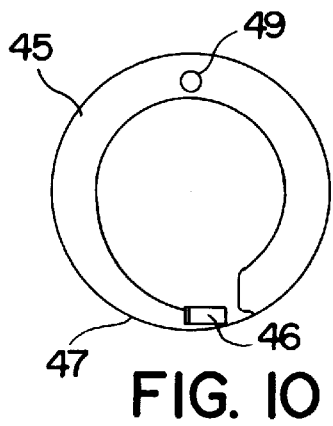
FIG. 10 is a view in detail of the ring portion at the end of the filter cartridge and of the pawl mounted thereon.
Figure 11:
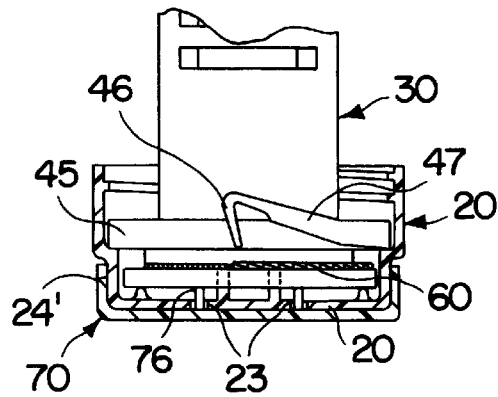
FIG. 11 is a cross-sectional view of a modified form of device in accordance with the present invention.

The flange 34 is of annular configuration having a serrated end surface 43 and an outer circumferential projection provided with a flat surface portion 44. A ring member 45 shown in FIG. 10 is positioned behind the flange 34 in surrounding relation to the cartridge 30 and has a spring-like or resilient finger which defines a pawl 46 projecting away from the flange 34 toward the end wall 22 as shown in FIGS. 1, 2 and 11. The outer peripheral surface of the ring 45 bears against and is permanently affixed to the shoulder 26 so that the cap 20 and filter cartridge 30 are united against relative movement. The ring member 45 is rotationally fixed with respect to the flange 34 by a locating pin 49 which is inserted into a correspondingly sized bore 48 on the flange portion 43 of the filter cartridge 30. The pawl 46 includes a circumferentially extending, offset portion 47 of reduced thickness relative to the rest of the ring 45 and terminates in a slender projection defining the finger portion of the pawl 46 which projects somewhat in an axial direction away from the ring 45 toward the end wall 22. The pawl 46 is of sufficient resiliency as to be capable of bending between slightly less than a right angle or relaxed position shown in FIG. 1 and a more extreme acute angle or compressed position as shown in FIG. 2.

Figure 5:
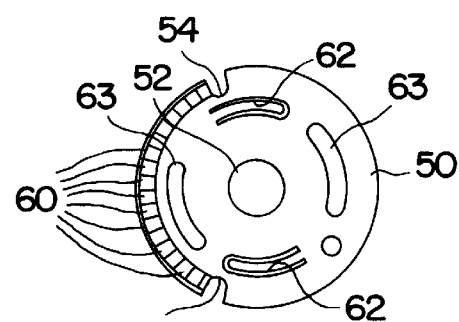
FIG. 5 is a plan view of a preferred form of disk employed in the device of the present invention.
Figure 4:
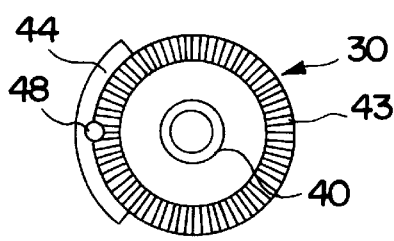
FIG. 4 is an end view of the filter cartridge shown in FIG. 3.
Figure 6:
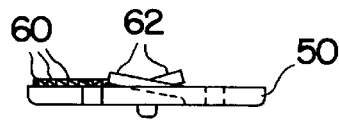
FIG. 6 is a side view of the disk illustrated in FIG. 5.
Figure 7:
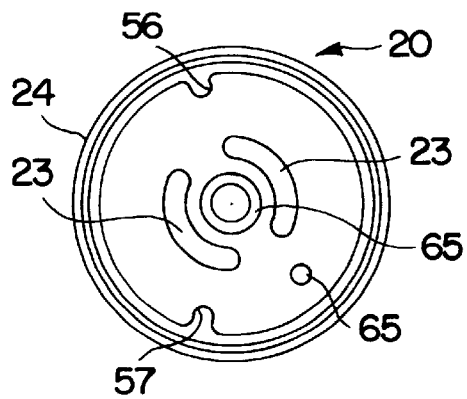
FIG. 7 is an end view of the inside of the preferred form of cap employed in accordance with the present invention.
Figure 8:
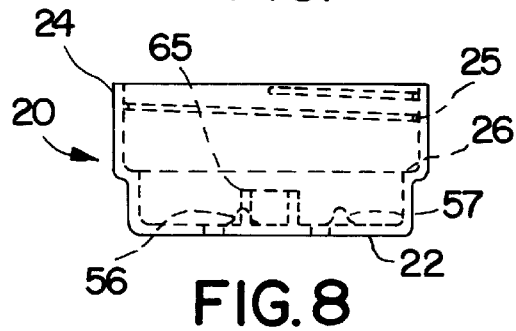
FIG. 8 is a side view in elevation of the cap illustrated in FIG. 7.

Referring to FIGS. 5 & 6, a disk 50 defines a movable portion of the device 12 and is inserted into the reduced end of the cap 20 between the cartridge 30 and the end wall 22. The disk has a central opening 52 extending through its thickness and a pair of circumferentially spaced notches 54 and 55. When the cap is threaded on and off a bottle(s) a selected number of times causing the pawl to incrementally advance the disk 50, the notches 54, 55 are brought into registry with nodules 56 and 57, respectively, and a bore 59 is aligned with a pin 65 on the inner surface of the end wall 22. As shown in FIG. 2, after the selected number of times, the disk 50 is then free to be advanced downwardly under the urging of dogs 62 hereinafter described against the inner surface of the end wall 22, and an indicator pin 58 on the surface of the disk 50 will project through one of the slots 23.

Figure 9:
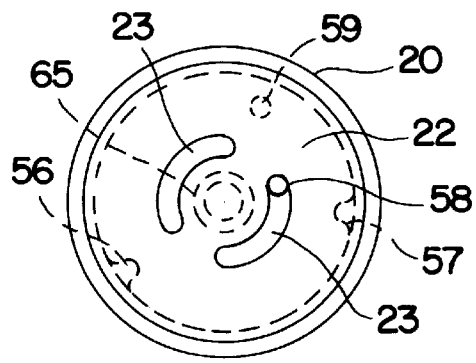
FIG. 9 is an end view of the outside of the cap illustrated in FIGS. 7 and 8.

A series of ratchet teeth 60 are formed along an outer peripheral edge portion of the disk 50 between the notches 54, 55 and in facing aligned relation to the pawl 46. Each time that the cap 20 is threaded onto a bottle, the pawl 46 is compressed, as shown in FIG. 1, into engagement with a ratchet tooth 60 to rotate the disk 50 for a distance such that the next ratchet tooth 60 will move into position beneath the pawl 46. Throughout this interval, the pin 58 will be visible through the slot 23 to serve as a reminder or indicator of the remaining life of the filter F but will not drop into the slot 23, as shown in FIG. 2, until the last tooth 60 is advanced by the pawl and the nodules 56, 57 move into the notches 54, 55, respectively, as previously described. At this point, the cap 20 will be unable to rotate the disk 50 any further since the nodules 56, 57 are inserted in the notches 54, 55 and the pin 58 will be at the end of the slot, as illustrated in FIG. 9, to resist any further rotation of the disk 50.

In order to prevent return or reverse movement of the pawl 46 relative to the ratchet teeth, i.e., to prevent resetting of the cap 20 and the indicator pin 58, the disk 50 is provided with a pair of diametrically opposed projections or dogs 62 which project or slope slightly away from the surface of the disk 50 toward the serrated end surface 44. Each of the dogs 62 is of somewhat arcuate configuration and cut out of the thickness of the disk 50 with its free or tip end engaging the serrations on the surface 43. The serrations define stop elements which are sloped to an extent which will effectively lock the disk 50 in a clockwise direction against any return movement, and the pawl 46 in turn will resist any movement in a counterclockwise direction.

Water is free to flow downwardly through the filter cartridge 30 as described and through diametrically opposed slots 63 in the disk 50 as well as the slots 23 in the end wall 22 of the cap 20 until the disk 50 moves against the inner surface of the end wall 22 to interrupt the flow of water through the slots 23. The disk 50 is also centered on a circular boss 65 on the inside of the end wall 22 of the cap 20. In this relation, when the disk 50 is inserted into the cap it will bear against the boss 65 and should be oriented such that the indicator pin 58 is positioned at one end of the slot 23, as illustrated in FIG. 9, to indicate the beginning of the cycle.

DETAILED DESCRIPTION OF MODIFIED FORM OF INVENTION

Figure 12:
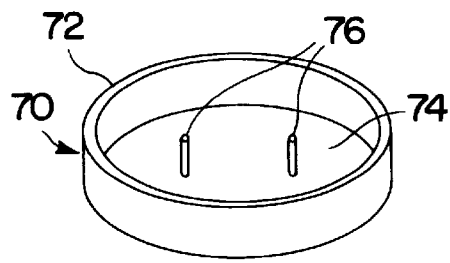
FIG. 12 is a perspective view of a resetting wrench forming a part of the modified form of the present invention shown in FIG. 11.

An alternate form of invention is illustrated in FIGS. 11 and 12 in which like elements are correspondingly enumerated to those of the preferred form. Specifically, a resetting wrench or key 70 is in the form of a cap having a side wall 72 and an end wall 74, the latter provided with a pair of spaced lugs or posts 76 on its inside surface. The cap 72 is dimensioned so that the side wall 74 can be slipped over the side wall 24' of the cap 20 of the preferred form, and the posts 76 are spaced apart a distance such that they are aligned with the slots 23. As best seen in FIG. 11, the posts 76 are of sufficient length to extend through the end wall 22 and force the disk 50 away from its fully seated position shown in FIG. 2 until the notches 54, 55 clear the nodules 56, 57 whereupon rotation of the wrench 70 will cause return movement of the disk 50 to its original setting. Thus, the pawl 46 will return into alignment with the first ratchet tooth 60 as shown in FIG. 1. In order to overcome the resistance of the serrated end surface 44, it may be desirable to change the tooth profile of the serrations and/or to provide bores in the surface of the disk 50 to receive the posts 76 so that a positive torque can be applied to the disk 50.

The resettable cap 20 as described is intended for use with a filter cartridge 30 in which the filter F is replaceable, such as, by making the closed end 36 removable. Accordingly, at the end of each filter cycle after the pawl 46 has completed its advancement across the ratchet teeth 60, the resetting wrench 70 can be assembled onto the end of the cap 20 and the disk 50 depressed and rotated until the pawl 46 returns to its original setting.

Figure 13:
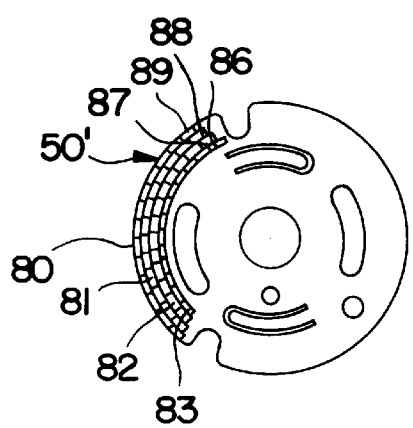
FIG. 13 is a plan view of a modified form of control disk of the type shown in FIG. 5.

A modified form of disk 50' is illustrated in FIG. 13 wherein a plurality of rows of ratchet teeth 80, 81, 82 and 83 are provided, the individual ratchet teeth in each row 80–83 corresponding to the ratchet teeth 60 of the preferred form; however, the ratchet teeth of the modified form are staggered so as to reduce the effective spacing between advancement of the pawl 46 between successive or adjacent rachet teeth. For example, referring again to FIG. 13, the pawl 45 would advance from a first ratchet tooth 86 on the inner row 83 to a first rachet tooth 87 on the row 82 when it is threaded onto the end of the next container; the pawl 46 would next advance to one of the ratchet teeth 88 in the row 81 and thereafter to a next adjacent ratchet tooth 89 in the outmost row 80; and would return to the next rachet tooth 86 on the inner row 83 when threaded onto the next container in succession. As previously stated, the number of rachet teeth on the disk 50 or 50' would correspond to the number of containers over the useful life of the filter. Essentially, the number of rachet teeth can be accurately calculated based on the volume of container with which the cap is to be used; and, as the container volume increases, the number of filter teeth or uses of the filter would decrease for a given size of filter. For instance, the multiple rows of rachet teeth illustrated in FIG. 13 would be useful with smaller sized drink bottles which contain on the order of eight ounces of water. If the cap is to be used for larger sized drink bottles, of course the number of rows of filter teeth or the number of teeth may be decreased.

In practice, when the cap 20 of the preferred form is threaded onto a container C with a previously unused filter F, the disk 50 will assume the position shown in FIG. 1 resting on the nodules 56, 57 and the pawl 46 actually will have advanced from the first ratchet tooth 60 to the second tooth 60 as the cap 20 is tightened and the pawl 46 compressed against the teeth. The liquid in the container is free to pass downwardly through the filter F as described, through the central opening 52 and the slots 23 and collect in a reservoir, not shown, in the bottom of the cooler. Thereafter, it is withdrawn through a tap in a well-known manner. When the contents are depleted, the empty container is removed and the cap 20 is removed from that container to refill it or to place the cap 20 on another full container. When used with smaller bottles as described in connection with FIG. 13, the cap 20 would be modified to permit the water to pass through some form of manifold or port with controllable valve on the endwall 22 so that the bottle may be inverted and removed directly from the end of the cap 20. In either case, when the cap 20 is removed the pressure on the flange 34 is relieved sufficiently for the pawl 46 to be retracted away from the ratchet teeth 60. Once again, when threaded onto a container, the increased pressure will cause the pawl 46 to be compressed against a tooth 60 and advance the disk 50 as well as the indicator pin 58. The container C is then inverted and remounted on the cooler.

When the end of the filter cycle is reached, preferably the cap 20 and its filter F are discarded and replaced with a new cap 20 and filter F. Of course, in accordance with the alternate form of invention, the cap 20 may be reset and the filter F replaced.

It is therefore to be understood that while preferred and alternate forms of the invention are herein set forth and described, the above and other modifications and changes may be made without departing from the spirit and scope of the present invention as defined by the appended claims and reasonable equivalents thereof.

We claim:

1. A filter use limitation device for monitoring use of said device based on the number of times it is threaded onto one or more containers adapted to be inverted during filter use and wherein each container is provided with a normally open threaded end, said device comprising:

a cap engageable with said threaded end of each said container;

a filter cartridge associated with said cap having a filter in a hollow portion of said cartridge and a pawl at one end thereof; and a disk interposed between said cartridge and an end wall of said cap including an indicator aligned with a slot in said cap, and at least one row of ratchet teeth engageable by said pawl in succession to rotate said disk with respect to said cap a distance proportional to the distance between each pair of adjacent of said ratchet teeth each time that said cap is rotated onto said threaded end of each said container, and limit means between said disk and cap wherein liquid is normally free to flow from said liquid container through said filter cartridge, disk and cap until said disk has been rotated a selected number of times by said pawl and said disk is then movable into closed relation to said cap thereby interrupting the flow of liquid therethrough.

2. A filter use limitation device according to claim 1, wherein anti-reverse means is provided between said disk and said cartridge to prevent reverse movement of said disk relative to said cap.

3. A filter use limitation device according to claim 2 wherein said anti-reverse means is defined by stop elements on one of said disk and said cartridge and a projection on said other of said disk and said cartridge engageable with one of said stop elements.

4. A filter use limitation device according to claim 3 wherein said stop elements are in the form of a serrated surface on said cartridge and said projection being in the form of a cutout portion in said disk.

5. A filter use limitation device according to claim 1 wherein said pawl is defined by a resilient finger projecting toward said ratchet teeth, said cartridge being mounted in fixed relation to said end of said container with said finger engageable with one of said teeth.

6. A filter use limitation device according to claim 5 wherein said limit means is provided between said disk and said cap to maintain said disk in normally adjacent but spaced relation to said end wall, said disk being rotatable into a closed position against said end wall to advance said indicator through said slot and prevent further rotation of said disk.

7. A filter use limitation device according to claim 6 wherein said limit means includes at least one nodule between said disk and said end wall engageable with a notch in said other of said disk and said end wall.

8. A filter use limitation device according to claim 1 wherein a resetting tool is releasably engageable with said cap to depress said indicator away from said slot to permit advancement of said pawl and said indicator back to a starting point in said filter cycle and return said disk into spaced relation to said end wall.

9. A filter use limitation device according to claim 8 wherein said resetting tool is provided with at least one rotational drive member insertable through said slot in said cap.

10. A filter use limitation device according to claim 9, wherein said tool is provided with a pair of said drive members in the form of posts respectively insertable through a pair of said slots in said cap.

11. A filter use limitation device according to claim 1, said cap having a shoulder between an internally threaded portion and an end portion of reduced diameter.

12. A filter use limitation device according to claim 11, said cartridge having a flange at said one end affixed to said shoulder.

13. A filter use limitation device for monitoring use of said device based on the number of times it is threaded onto one or more containers adapted to be inverted during filter use and wherein each said container is provided with a normally open threaded end, said device comprising:

a cap engageable with said threaded end of each said container;

a pawl;

a filter cartridge associated with said cap having a filter in a hollow portion of said cartridge; and a disk interposed between said cartridge and an end wall of said cap including an indicator aligned with a slot in said cap, said pawl disposed between said cartridge and said disk and an arcuate row of ratchet teeth engageable by said pawl in succession to rotate said disk with respect to said cap a distance corresponding to the distance between each pair of adjacent of said teeth in response to advancement of said pawl each time that said cap is rotated onto said threaded end of said container, and limit stop means between said disk and cap wherein liquid is normally free to flow from said liquid container through said filter cartridge, disk and cap until said disk has been rotated a selected number of times by said pawl and thereafter is free to advance into closed relation to said cap thereby interrupting the flow of liquid therethrough, and said limit stop means being interposed between said disk and said cap to maintain said disk in normally adjacent but spaced relation to said end wall, said disk being rotatable to a position to advance said indicator through said slot and prevent further rotation of said disk by said pawl.

14. A filter use limitation device according to claim 13, wherein anti-reverse means is provided between said disk and said cartridge to prevent reverse movement of said disk relative to said cap, and said anti-reverse means is defined by stop elements on one of said disk and said cartridge and a projection on said other of said disk and said cartridge engageable with one of said stop elements.

15. A filter use limitation device according to claim 14 wherein said stop elements are in the form of a serrated surface on said cartridge and said projection being in the form of a cutout portion in said disk.

16. A filter use limitation device according to claim 13 wherein said limit stop means includes at least one nodule between said disk and said end wall engageable with a notch in said other of said disk and said end wall.

17. A filter use limitation device according to claim 13 wherein a wrench is releasably engageable with said cap to depress said indicator away from said slot to permit advancement of said pawl and said indicator back to a starting point in said filter cycle and return said disk into spaced relation to said end wall, said wrench being generally cup-shaped and provided with at least one post insertable through said slot in said cap.

18. A filter use limitation device according to claim 13, said cap having a shoulder between an internally threaded portion and an end portion of reduced diameter, and said cartridge having a flange at said one end affixed to said shoulder.

19. A filter use limitation device according to claim 13 wherein there are a plurality of rows of said rachet teeth, said rachet teeth in each row being staggered with respect to adjacent of said rachet teeth in other of said rows.

20. A filter use limitation device for monitoring use of said device based on the number of times it is threaded onto one or more liquid-filled containers adapted to be inverted during filter use and wherein each said container is provided with a normally open threaded end, said device comprising:

a cap adapted to be disposed on the end of said container;

a filter cartridge associated with said cap having a filter in a hollow portion of said cartridge and a pawl at one end thereof; and a disk interposed between each said cartridge and an end wall of said cap including an indicator aligned with a slot in said cap, and at least one row of ratchet teeth engageable by said pawl in succession to rotate said disk with respect to said cap a distance proportional to the distance between each pair of adjacent teeth each time that said cap is placed onto the end of each said container, and wherein liquid is normally free to flow from said liquid container through said filter cartridge, disk and cap until said disk has been rotated a selected number of times by said pawl and advances into closed relation to said cap thereby interrupting the flow of liquid therethrough, the number of said ratchet teeth corresponding to the number of containers with which said filter can be effectively used.

* * * * *